(12) United States Patent
Kim

(10) Patent No.: US 9,783,111 B2
(45) Date of Patent: Oct. 10, 2017

(54) METHOD AND APPARATUS FOR VEHICLE DRIVING ASSISTANCE

(71) Applicant: HYUNDAI MOBIS Co., Ltd., Yongin-si (KR)

(72) Inventor: Suk Won Kim, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 74 days.

(21) Appl. No.: 14/934,403

(22) Filed: Nov. 6, 2015

(65) Prior Publication Data

US 2016/0129835 A1 May 12, 2016

(30) Foreign Application Priority Data

Nov. 11, 2014 (KR) .................. 10-2014-0156262

(51) Int. Cl.
*B60Q 9/00* (2006.01)
*G06T 3/00* (2006.01)
*G06K 9/00* (2006.01)

(52) U.S. Cl.
CPC ......... *B60Q 9/008* (2013.01); *G06K 9/00798* (2013.01); *G06K 9/00805* (2013.01); *G06T 2210/21* (2013.01)

(58) Field of Classification Search
CPC ............... B60Q 9/008; G06K 9/00798; G06K 9/00805; G06T 2210/21
See application file for complete search history.

(56) References Cited

U.S. PATENT DOCUMENTS

| | | | |
|---|---|---|---|
| 8,587,418 B2* | 11/2013 | Mochizuki ............. | B60Q 9/008 340/435 |
| 2008/0162027 A1* | 7/2008 | Murphy ................ | B60W 50/14 701/117 |
| 2012/0025965 A1* | 2/2012 | Mochizuki ............. | B60Q 9/008 340/435 |

* cited by examiner

*Primary Examiner* — Anne M Antonucci
(74) *Attorney, Agent, or Firm* — Mayer Brown LLP; Hyunho Park

(57) ABSTRACT

The present invention relates to an apparatus for vehicle driving assistance, including: a camera photographing a front of a vehicle; a traffic sign board sensing unit sensing a traffic sign board in front of the vehicle; a traffic lane sensing unit sensing a traffic lane in front of the vehicle; a vehicle sensing unit sensing a vehicle in front of the vehicle; a collision warning unit raising a collision warning; and a control unit determining a collision risk situation and controlling the collision warning unit to raise the collision warning when determining that there is the collision risk situation.

20 Claims, 3 Drawing Sheets

METHOD AND APPARATUS FOR VEHICLE DRIVING ASSISTANCE

CROSS-REFERENCE TO RELATED APPLICATIONS

The present application claims priority to Korean Patent Application Number 10-2014-0156262 filed Nov. 11, 2014, the entire contents of which application is incorporated herein for all purposes by this reference.

TECHNICAL FIELD

The present invention relates to an apparatus and a method for vehicle driving assistance, and more particularly, to an apparatus and a method for vehicle driving assistance which warns a driver when a distance from a vehicle in front of a driving vehicle is less than a predetermined distance and warns the driver when a distance from an opposite vehicle positioned at the left side of a median strip is less than a predetermined distance when the vehicle turns left with no turn signal.

BACKGROUND

In recent years, large and small accidents among vehicles have occurred due to a rapid increase in the number of vehicles. Therefore, a forward collision warning system has been adopted in a lot of vehicles. A preceding vehicle that precedes a vehicle is close to its own vehicle due to momentary carelessness or drowsy driving of the driver, the forward collision warning system warns the driver.

In recent years, a technology has been under research, which notifies an emergency situation to the driver with respect to an opposite vehicle that comes closer from an opposite side to the vehicle in addition to the preceding vehicle.

SUMMARY

The present invention has been made in an effort to provide an apparatus and a method for vehicle driving assistance which sense a vehicle by setting a region of interest in a preceding vehicle in a vehicle front image to warn a driver when a distance from the preceding vehicle is less than a predetermined distance value and warn the driver when a distance from the sensed vehicle and an opposite vehicle positioned at the left side of a median strip is less than the predetermined distance even at the time when the vehicle turns left with no turn signal by setting the region of interest in the opposite vehicle at a left side of the media strip in the vehicle front image when the vehicle turns left with no turn signal.

Objects of the present invention are not limited to the objects described above, and other objects that are not described will be clearly understood by a person skilled in the art from the description below.

An exemplary embodiment of the present invention provides an apparatus for vehicle driving assistance, including: a camera photographing a front of a vehicle; a traffic sign board sensing unit sensing a traffic sign board in front of the vehicle; a traffic lane sensing unit sensing a traffic lane in front of the vehicle; a vehicle sensing unit sensing a vehicle in front of the vehicle; a collision warning unit raising a collision warning; and a control unit determining a collision risk situation and controlling the collision warning unit to raise the collision warning when determining that there is the collision risk situation.

The control unit may control the collision warning unit to raise the collision warning when a no-turn-signal sign board is sensed by the traffic sign board sensing unit, the vehicle turns left, and an opposite vehicle at a left side of a median strip is sensed by the vehicle sensing unit.

Another exemplary embodiment of the present invention provides a method for vehicle driving assistance, including: a photographing step of photographing a front of a vehicle; a sensing step of sensing a vehicle, a traffic sign board, and a traffic lane in front of the vehicle; a no-turn-signal left-turn determining step of determining whether the vehicle turns left when a no-turn-signal sign board is sensed in front of the vehicle; an opposite vehicle sensing step of sensing a median strip and determining whether the opposite vehicle exists at a left side of the median strip when the no-turn-signal sign board is sensed in front of the vehicle and the vehicle turns left; and a collision warning step of raising a collision warning when the opposite vehicle exists.

Other detailed contents of the exemplary embodiments are included in the description and drawings.

According to the apparatus and the method for vehicle driving assistance, one or more following effects are achieved.

First, safety is improved when a vehicle turns left with no turn signal by recognizing a left-turn mark and a median strip on a vehicle driving road surface.

Second, an opposite vehicle is sensed by setting a portion where the opposite vehicle exists as a region of interest when the vehicle turns left with no turn signal.

The effects of the present invention are not limited to the effects described above, and a person of ordinary skill in the art will clearly understand other effects that are not described from the description of the scope of the claims.

DETAILED DESCRIPTION

Figure 1:
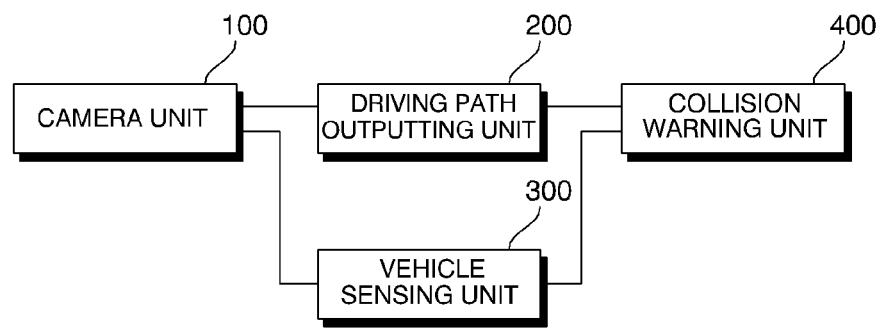
FIG. 1 is a configuration diagram illustrating a configuration of an apparatus for vehicle driving assistance according to the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, the present invention will be described with reference to drawings for describing an apparatus for vehicle driving assistance according to exemplary embodiments of the present invention.

FIG. 1 is a configuration diagram illustrating a configuration of an apparatus for vehicle driving assistance according to the present invention.

The apparatus for vehicle driving assistance according to the present invention may include a camera 100 photographing a front of a vehicle, a traffic sign board sensing unit 200 sensing a traffic sign board in front of the vehicle, a traffic lane sensing unit 300 sensing a traffic lane in front of the vehicle, a vehicle sensing unit 400 sensing a vehicle in front of the vehicle, a collision warning unit 600 raising a collision warning, and a control unit 500 determining a collision risk situation and controlling the collision warning unit 600 to raise the collision warning when determining that there is the collision risk situation.

The control unit 500 may control the collision warning unit 600 to raise the collision warning when a no-turn-signal sign board is sensed by the traffic sign board sensing unit 200, the vehicle turns left, and an opposite vehicle at a left side of a median strip is sensed by the vehicle sensing unit 400.

The camera 100 is installed at a position to photograph the front of the vehicle. The camera 100 outputs a vehicle front image according to a horizontal view angle range set according to the performance thereof.

The traffic lane sensing unit 300 may sense other traffic information marked on a road surface in addition to the traffic lanes. For example, when a left-turn mark is shown on the road surface, the traffic lane sensing unit 300 senses the left-turn mark to determine that a vehicle is currently on a left-turn traffic lane.

The vehicle sensing unit 400 has a region of interest which is an area where the vehicle is sensed. The region of interest is a specific area which exists in an image photographed by the camera 100. When the vehicle exists in the region of interest, the vehicle sensing unit 400 may sense the corresponding vehicle.

The vehicle sensing unit 400 may sense the vehicle by setting a region of interest ROI on a driving traffic lane of the vehicle on which a preceding vehicle exists. The vehicle sensing unit 400 acquires distance information from an actual vehicle which exists in a specific direction in the vehicle front image. The vehicle sensing unit 400 converts the distance information into an image coordinate. The vehicle sensing unit 400 projects the image coordinate to the image to set the region of interest ROI for recognizing the vehicle based on the image coordinate projected to the image. The vehicle sensing unit 400 may set the ROI in a preceding vehicle existence region at a right side of the median strip MS. The vehicle sensing unit 400 may output distance values between the vehicle and the preceding vehicle and between the vehicle and the opposite vehicle.

The control unit 500 may control the collision warning unit 600 to raise the collision warning when the preceding vehicle is sensed on the same lane as the vehicle in the ROI and a distance between the vehicle and the preceding vehicle is less than a predetermined distance.

That is, the apparatus for vehicle driving assistance according to the present invention notifies that there is a collision risk to a driver of the vehicle in order to prevent the vehicle and a vehicle which precedes the vehicle from colliding with each other.

The control unit 500 may correct the ROI with the region at the left side of the median strip when the no-turn-signal sign board is sensed by the traffic sign board sensing unit 200 and a left-turn direction indicating lamp of the vehicle is actuated and control the collision warning unit 600 to raise the collision warning when the opposite vehicle at the left side of the median strip is sensed in the corrected ROI.

The control unit 500 may receive a signal indicating that the left-turn direction indicating lamp is actuated through vehicular controller area network (CAN) communication. When the left-turn direction indicating lamp of the vehicle is actuated, the control unit 500 determines that the vehicle will turn left. This is to prevent the collision with the opposite vehicle which is opposite to the median strip when the vehicle turns left with no turn signal.

The control unit 500 may correct the ROI with the region at the left side of the median strip when the no-turn-signal sign board is sensed by the traffic sign board sensing unit 200 and it is sensed that the vehicle is on the left-turn lane and control the collision warning unit 600 to raise the collision warning when the opposite vehicle at the left side of the median strip is sensed in the corrected ROI.

When it is sensed that the vehicle is on the left-turn lane, the control unit 500 determines that the vehicle will turn left.

Besides, a method for determining whether the vehicle turns left may include a method for sensing a motion of a handle of the vehicle, a method for sensing pressure applied to a suspension of the vehicle, or a method for using a slope sensor.

When the vehicle turns left with no turn signal, the vehicle sensing unit 400 senses the vehicle by setting the region of interest ROI as a left region of interest CROI of the median strip where the opposite vehicle exists.

When the distance between the vehicle and the opposite vehicle is less than the predetermined distance, the control unit 500 may control the collision warning unit 600 to raise the collision warning. A user may arbitrarily set the predetermined distance.

The collision warning is used to notify that there is a risk of the collision to the driver and is not limited thereto.

The traffic sign board sensing unit 200 may sense the traffic sign board by using a traffic sign recognition (TSR) function. A technology applied to the traffic sign board sensing unit 200 may be a technology that senses the traffic sign board and is not limited thereto.

The traffic lane sensing unit 300 may convert the image photographed by the camera 100 into a perspective view image by using warp perspective mapping (WPM) and sense the traffic lane by considering a color and the width of the traffic lane in the perspective view image.

The traffic lane sensing unit 300 extracts a binary-coded image acquired by extracting a white region and extracts a binary-coded image acquired by extracting a yellow region in the perspective view image to sense the traffic lane.

When the aforementioned process is described in detail, the traffic lane sensing unit 300 converts the converted perspective view image into a binary-coded black-and-white image. The traffic lane sensing unit 300 acquires the binary-coded image acquired by extracting the white region. The traffic lane sensing unit 300 converts a vehicle front image input by the color into an HSV color space. The traffic lane sensing unit 300 acquires the binary-coded image acquired by extracting the yellow region by using a hue value in the vehicle front image converted into the HSV color space.

The traffic lane sensing unit 300 applies a horizontal distance-based sampling algorithm to the extracted white region and yellow region to extract a traffic lane region.

The traffic lane sensing unit 300 integrates the binary-coded image acquired by extracting the white region and the binary-coded image acquired by extracting the yellow region and extracts a region estimated as the traffic lane by applying traffic lane width information in the integrated binary-coded image to sense the traffic lane.

The traffic lane sensing unit 300 may sense a white part as a white traffic lane and a yellow part as the median strip in the integrated binary-coded image.

The traffic lane sensing unit 300 recognizes a white color as a traffic lane change line WS in the region estimated as the traffic lane. The traffic lane sensing unit 300 recognizes a yellow color as the median strip in the region estimated as the traffic lane. The traffic lane sensing unit 300 recognizes the yellow color at a left side of the vehicle as the median strip MS.

The traffic lane sensing unit 300 models pixels of the traffic lane region extracted in the traffic lane region into a curved or linear traffic lane by using a parameter curve. The parameter curve of the traffic lane sensing unit 300 may be an n-th Bezier curve or spline curve. The traffic lane sensing unit 300 applies a filtering algorithm to the modeled curve or linear traffic lane to calculate traffic lane information. The traffic lane sensing unit 300 may use at least one of a Kalman filter, an extended Kalman filter, and a particle filter at the time of applying the filtering algorithm.

Figure 2:
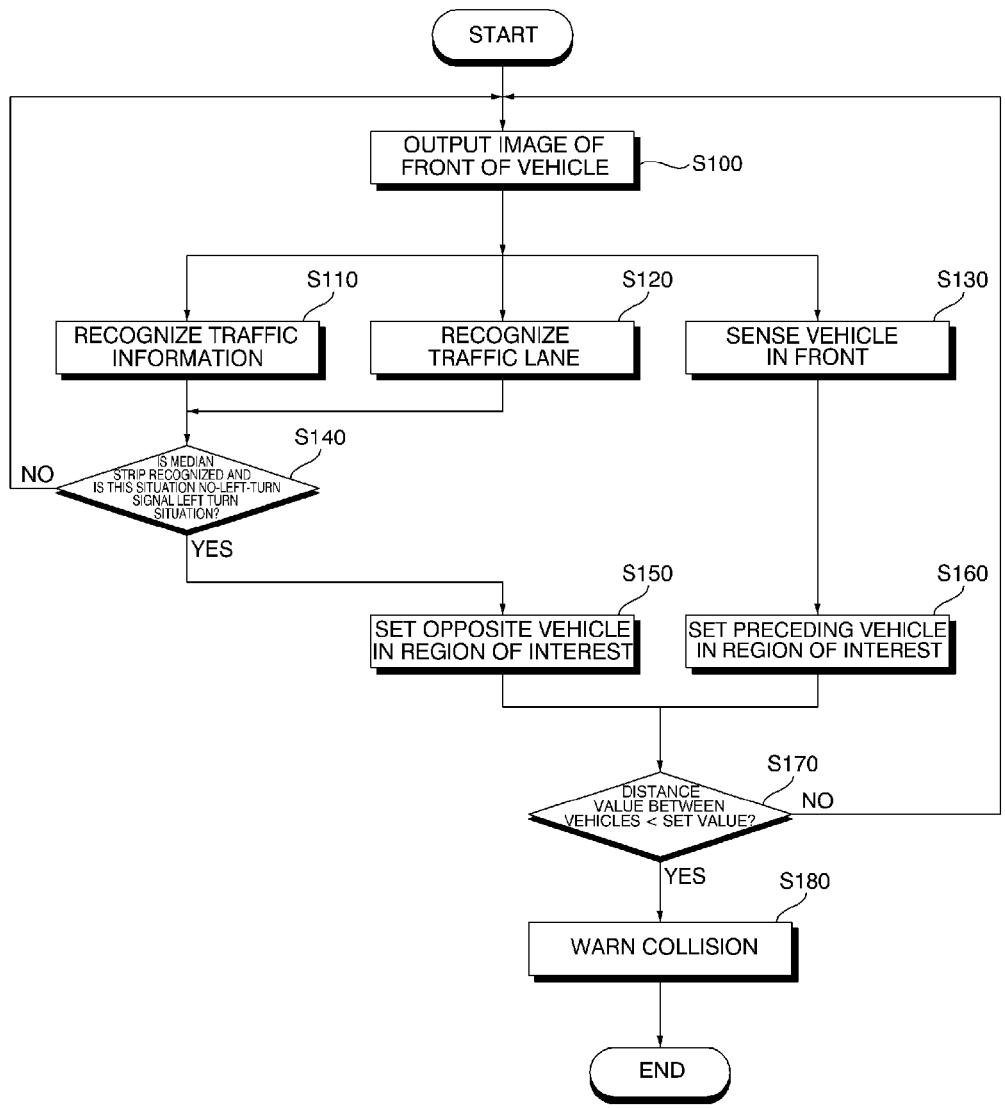
FIG. 2 is a flowchart illustrating a control flow of a method for vehicle driving assistance according to the present invention.

FIG. 2 is a control flowchart illustrating a control flow of a method for vehicle driving assistance according to the present invention.

The method for vehicle driving assistance according to the present invention may include a photographing step of photographing a front a vehicle, a sensing step of sensing a vehicle, a traffic sign board, and a traffic lane in front of the vehicle, a no-turn-signal left-turn determining step of determining whether the vehicle turns left when a no-turn-signal sign board is sensed in front of the vehicle, an opposite vehicle sensing step of sensing a median strip and determining whether the opposite vehicle exists at a left side of the median strip when the no-left-turn signal sign board is sensed in front of the vehicle and the vehicle turns left, and a collision warning step of raising a collision warning when the opposite vehicle exists.

In the collision warning step, a collision warning may be raised when a distance between the vehicle and the opposite vehicle is less than a predetermined distance.

In the sensing step, a region of interest which is a specific region exists in the photographed image and the vehicle that exists in the ROI is sensed at the time of sensing the vehicle.

In the opposite vehicle sensing step, the ROI may be corrected with a region at the left side of the median strip. Thereafter, the vehicle is sensed based on the corrected ROI.

In the traffic sign board sensing step, the traffic sign board may be sensed by using the traffic sign recognition (TSR) function.

In the opposite vehicle sensing step, when the media strip is sensed, the image photographed by the camera 100 may be converted into a perspective view image by using warp perspective mapping (WPM) and a color and the width of the traffic lane may be considered in the perspective view image.

In the opposite vehicle sensing step, a binary-coded image acquired by extracting a white region and a binary-coded image acquired by extracting a yellow region in the perspective view image may be extracted at the time of sensing the median strip.

In the opposite vehicle sensing step, when the median strip is sensed, the binary-coded image acquired by extracting the white region and the binary-coded image acquired by extracting the yellow region are integrated and a region estimated as the traffic lane is extracted by applying traffic lane width information in the integrated binary-coded image to sense the median strip.

In the opposite vehicle sensing step, a white part may be sensed as a white traffic lane and a yellow part may be sensed as the median strip in the integrated binary-coded image, at the time of sensing the median strip.

In the no-left-turn signal left-turn determining step, when it is determined whether the vehicle turns left, it may be determined whether the vehicle turns left according to whether a left direction indicating lamp of the vehicle is actuated.

In the no-left-turn signal left-turn determining step, when it is determined whether the vehicle turns left, it may be determined whether the vehicle turns left according to whether the vehicle is currently positioned on a left-turn lane.

Figure 3:
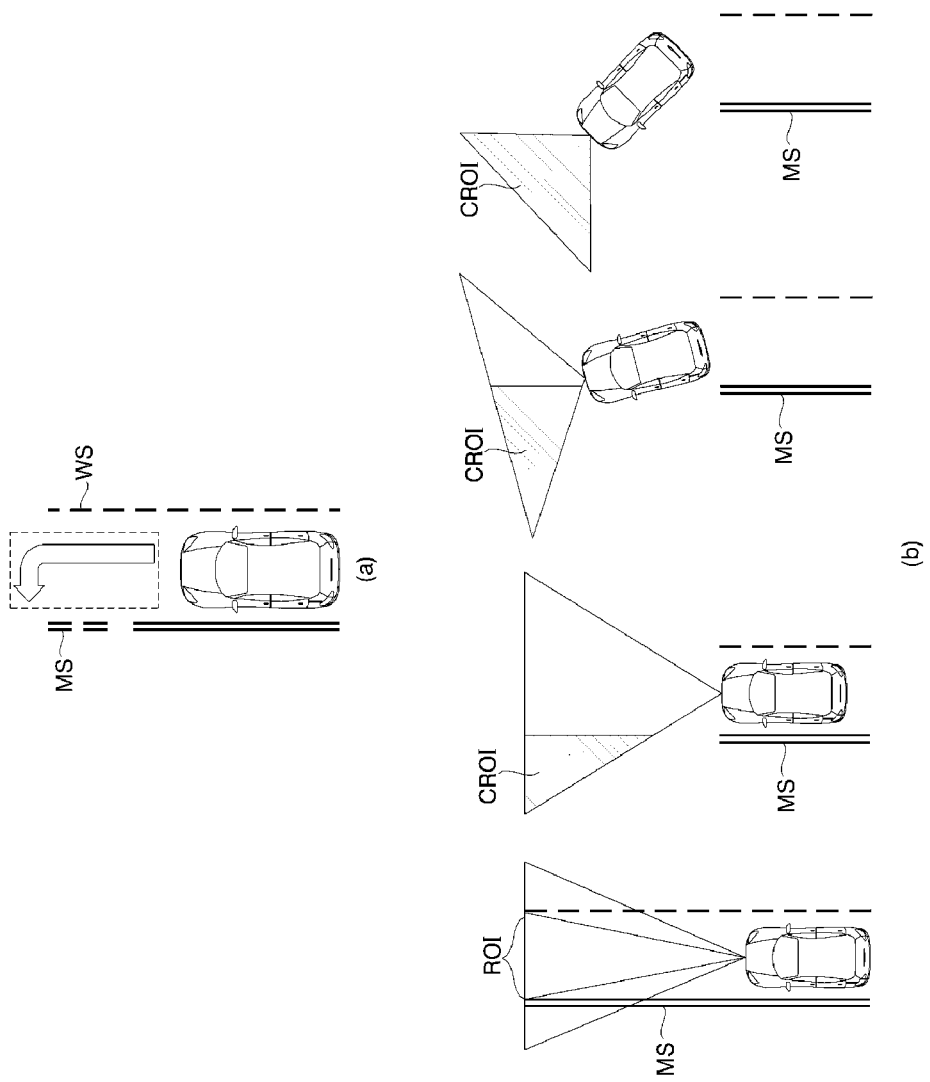
FIG. 3 is a road driving diagram of a vehicle illustrating a driving state of the vehicle which is on a left-turn path with no turn signal.

FIG. 3 is a road driving diagram of a vehicle illustrating a driving state of the vehicle which is on a left-turn path with no turn signal. FIG. 3 illustrates a case in which the traffic lane sensing unit 300 senses that the vehicle turns left by sensing traffic lanes and marks on a road surface to prevent a vehicle collision when the vehicle turns left with no turn signal. FIG. 3A is a vehicle driving diagram illustrating a state in which the vehicle has a no-left-turn signal left-turn path ahead. The traffic lane sensing unit 300 recognizes a left-turn mark (LS) on the road surface. The traffic lane sensing unit 300 recognizes a yellow color in an image of the front of the vehicle to recognize the median strip MS. The traffic lane sensing unit 300 recognizes a yellow traffic lane constituted by a single line and a yellow traffic lane formed by two lines to recognize the median strip (MS). The traffic lane sensing unit 300 may recognize a traffic lane formed by the white color. The method in which the traffic lane sensing unit 300 recognizes the traffic lane has already been described above.

FIG. 3B is a vehicle driving diagram illustrating a state in which the region of interest ROI is changed when the vehicle turns left on the left-turn path with no turn signal. The camera 100 outputs a vehicle front image according to a horizontal view angle rangeset according to the performance thereof.

The vehicle sensing unit 400 generally sets the region of interest (ROI) in front of the vehicle as illustrated in a first figure of FIG. 3B to sense a front object, that is, a preceding vehicle. When the vehicle is driven on the left-turn path with no turn signal, the vehicle sensing unit 400 recognizes the left-turn path with no turn signal to set the opposite vehicle existence region CROI at the left side of the median strip as the ROI as illustrated in a second figure of FIG. 3B. Third and fourth figures of FIG. 3B illustrate a situation in which the vehicle is turn-driven on the left-turn path with no turn signal and the traffic lane sensing unit 300 recognizes the media strip MS in real time and the vehicle sensing unit 400 sets the opposite vehicle existence region CROI at the left side of the median strip MS as the ROI in real time. In the fourth figure of FIG. 3B, the vehicle sensing unit 400 sets the opposite vehicle existence region CROI in a preceding vehicle existence region as the ROI after the vehicle crosses the median strip MS.

As an exemplary embodiment of the apparatus for vehicle driving assistance according to the present invention, the apparatus for vehicle driving assistance further includes a position output unit outputting a current position of the vehicle in order to prevent deviation from a driving path set as a destination when the vehicle is driven, in detail, deviation from the traffic lane of the driving path toward the destination and a navigation guiding the driving path from the current position of the vehicle to the destination when setting the destination and information shown on the surface of the road is sensed by the image photographed by the camera 100, and the traffic lane sensing unit 300 senses a surrounding traffic lane of the vehicle and the traffic sign board sensing unit 200 senses the traffic sign board in front of the vehicle and determines whether a traffic lane on which the vehicle is currently driven is a traffic lane on the driving path toward the set destination by using the current position of the vehicle, the sensed mark information of the road surface, the traffic lanes, and the traffic sign board.

The information (turning left, going straight, turning right, and the like) shown on the surface of the road based on the image photographed by the camera 100 is acquired through traffic sign board recognition and optical character recognition (OCR) algorithms of the image processing.

Information on the types of the traffic lanes is acquired by determining what type of traffic lane a traffic lane sensed by using a color, a shape, and the like of the traffic lane sensed by the traffic lane sensing unit 300 is.

The control unit 500 determines whether the traffic lane along the path toward the destination set in the navigation and a traffic lane on which the vehicle is currently driven coincide with each other and when both traffic lanes do not coincide with each other, the control unit 500 notifies the non-coincidence to the driver.

The control unit 500 notifies whether the vehicle is driven on the traffic lane toward the set destination to the driver when the traffic lane is changed based on the determined driving traffic situation and outputs an image showing a correct driving traffic lane to the navigation to guide the vehicle to be driven on the correct driving traffic lane.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An apparatus for vehicle driving assistance, the apparatus comprising:
    a camera photographing a front of a vehicle to output an image of the vehicle;
    traffic sign board sensing circuitry sensing a traffic sign board in front of the vehicle;
    traffic lane sensing circuitry sensing a traffic lane in front of the vehicle;
    vehicle sensing circuitry sensing a median strip and determining whether an opposite vehicle exists at a left side of the median strip, wherein the vehicle sensing circuitry sets a region of interest (ROI), which exists in the image of the vehicle, on the traffic lane;
    collision warning circuitry raising a collision warning; and
    control circuitry determining a collision risk situation and controlling the collision warning circuitry to raise the collision warning when determining that there is the collision risk situation,
    wherein the control circuitry controls the collision warning circuitry to raise the collision warning when a no-turn-signal sign board is sensed by the traffic sign board sensing circuitry, the vehicle turns left, and an opposite vehicle at a left side of a median strip is sensed by the vehicle sensing circuitry,
    wherein the ROI is corrected to a region at the left side of the median strip when it is determined that the opposite vehicle exists at the left side of the median strip and the vehicle turns left when the no-turn-signal sign board is sensed.

2. The apparatus of claim 1,
    the control circuitry controls the collision warning circuitry to raise the collision warning when the preceding vehicle is sensed on the same lane as the vehicle in the ROI and a distance between the vehicle and the preceding vehicle is less than a predetermined distance.

3. The apparatus of claim 2, wherein the control circuitry corrects the ROI with the region at the left side of the median strip when the no-turn-signal sign board is sensed by the traffic sign board sensing circuitry and a left-turn direction indicating lamp of the vehicle is actuated and controls the collision warning circuitry to raise the collision warning when the opposite vehicle at the left side of the median strip is sensed in the corrected ROI.

4. The apparatus of claim 2, wherein the control circuitry corrects the ROI with the region at the left side of the median strip when the no-turn signal sign board is sensed by the traffic sign board sensing circuitry and it is sensed that the vehicle is on a left-turn traffic lane and controls the collision warning circuitry to raise the collision warning when the opposite vehicle at the left side of the median strip is sensed in the corrected ROI.

5. The apparatus of claim 1, wherein when the distance between the vehicle and the opposite vehicle is less than the predetermined distance, the control circuitry controls the collision warning circuitry to raise the collision warning.

6. The apparatus of claim 1, wherein the traffic sign board sensing circuitry senses the traffic sign board by using a traffic sign recognition (TSR) function.

7. The apparatus of claim 1, wherein the traffic lane sensing circuitry converts the image photographed by the camera into a perspective view image by using warp perspective mapping (WPM) and senses the traffic lane by considering a color and the width of the traffic lane in the perspective view image.

8. The apparatus of claim 7, wherein the traffic lane sensing circuitry extracts a binary-coded image acquired by extracting a white region and extracts a binary-coded image acquired by extracting a yellow region in the perspective view image to sense the traffic lane.

9. The apparatus of claim 8, wherein the traffic lane sensing circuitry integrates the binary-coded image acquired by extracting the white region and the binary-coded image acquired by extracting the yellow region and extracts a region estimated as the traffic lane by applying traffic lane width information in the integrated binary-coded image to sense the traffic lane.

10. The apparatus of claim 9, wherein the traffic lane sensing circuitry senses a white part as a white traffic lane and a yellow part as the median strip in the integrated binary-coded image.

11. A method for vehicle driving assistance, the method comprising:
    photographing a front of a vehicle to output an image of the vehicle;
    sensing an opposite vehicle, a traffic sign board, and a traffic lane in front of the vehicle;
    setting a region of interest (ROI) in the image of the vehicle, on the traffic lane;

determining step of determining whether the vehicle turns left when a no-turn-signal sign board is sensed in front of the vehicle;

sensing a median strip and determining whether the opposite vehicle exists at a left side of the median strip when the no-turn-signal sign board is sensed in front of the vehicle and the vehicle turns left; and raising a collision warning when the opposite vehicle exists, wherein the ROI is corrected to a region at the left side of the median strip when it is determined that the opposite vehicle exists at the left side of the median strip and the vehicle turns left when the no-turn-signal sign board is sensed.

12. The method of claim 11, wherein a collision warning is raised when a distance between the vehicle and the opposite vehicle is less than a predetermined distance.

13. The method of claim 11, wherein a region of interest which is a specific region exists in the photographed image and the vehicle that exists in the ROI is sensed at the time of sensing the vehicle, and the ROI is corrected with a region at the left side of the median strip.

14. The method of claim 11, wherein the traffic sign board is sensed by using a traffic sign recognition (TSR) function.

15. The method of claim 11, wherein when the median strip is sensed, the image photographed by the camera is converted into the perspective view image by using the warp perspective mapping (WPM) and a color and the width of the traffic lane are considered in the perspective view image.

16. The method of claim 15, wherein a binary-coded image acquired by extracting a white region and a binary-coded image acquired by extracting a yellow region in the perspective view image are extracted at the time of sensing the median strip.

17. The method of claim 16, wherein when the median strip is sensed the binary-coded image acquired by extracting the white region and the binary-coded image acquired by extracting the yellow region are integrated and a region estimated as the traffic lane is extracted by applying traffic lane width information in the integrated binary-coded image to sense the median strip.

18. The method of claim 17, wherein a white part is sensed as a white traffic lane and a yellow part is sensed as the median strip in the integrated binary-coded image, at the time of sensing the median strip.

19. The method of claim 11, wherein when it is determined that the vehicle turns left, it is determined whether the vehicle turns left according to whether a left direction indicating lamp of the vehicle is actuated.

20. The method of claim 11, wherein when it is determined whether the vehicle turns left, it is determined whether the vehicle turns left according to whether the vehicle is currently positioned on a left-turn lane.

\* \* \* \* \*